Feb. 15, 1944. C. D. GRAVES 2,341,984
COLOSTOMY OUTFIT
Filed Feb. 6, 1942
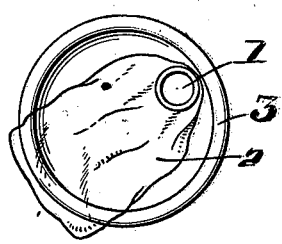
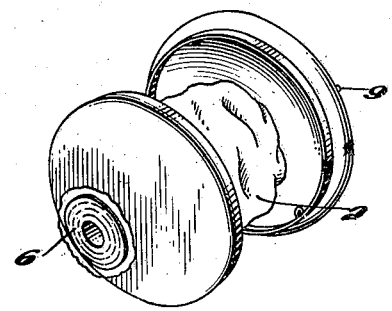
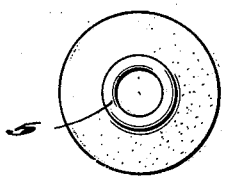
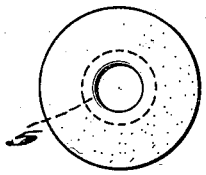
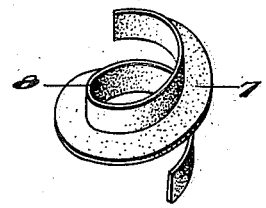
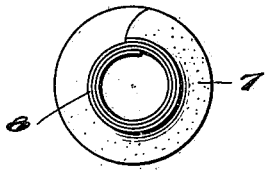
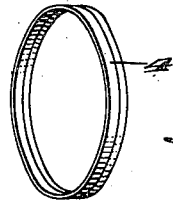
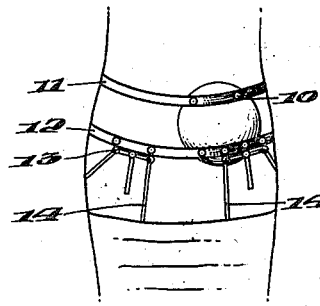
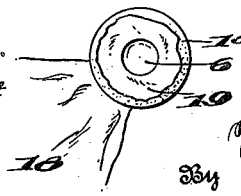
Inventor
CLARENCE DAVID GRAVES,
By Vernon E. Hodges
H. Hamlin Hodges his Attorneys Patented Feb. 15, 1944

2,341,984

UNITED STATES PATENT OFFICE 2,341,984

COLOSTOMY OUTFIT

Clarence David Graves, Dublin, Ga.

Application February 6, 1942, Serial No. 429,718

5 Claims. (Cl. 128—283)

The primary purpose of this invention is to provide a colostomy outfit for colostomy patients which prevents satisfactorily the soiling of the person of the wearer, allows practically no odor to escape, requires no disagreeable cleansing, adheres tightly to the abdomen but does not irritate the skin.

These useful and novel advantages are secured by using a wax-coated rubber tank stretched over a metal rim which fits, under pressure, tightly to the surface of the abdomen. A hole of suitable size is cut near one edge of the tank to receive the colostomy stoma. A Cellophane bag (or bag of any suitable material) is inserted through this opening and spread out on the under side of the rubber tank. The purpose of this bag is to receive the bowel discharge. Attention is directed to Fig. 1.

A rubber washer, flanged on the inner circumference, or flat, when cut along a radius, fitted to the colostomy and stitched when adjusted, forms a tight union about the colostomy, with the spread Cellophane bag and the skin of the abdomen. Attention is directed to Fig. 2. For day wear a flanged strip of rubber (Fig. 5) can be rolled tightly about the colostomy until it fits tightly into the hole in the edge of the rubber tank so that it makes an adjustable stopper which fits tightly both about the colostomy and into the mouth of the Cellophane bag. When coated with suitable wax this adjustable stopper becomes practically permanent in form. Attention is directed to Fig. 6.

Fig. 7 shows a metal rim which holds the outer rim of the rubber tank rigid. Fig. 8 shows the metal front which fits into and closes the tank, thus preventing the escape of odor. This front may be of different depths.

The elastic belt is composed of two strips of elastic webbing which snap on the metal front (Fig. 9), thus holding the tank firmly in place. The upper elastic strip is adapted to fit above the hips. It carries a loop of suitable material equipped with a safety pin for holding the clothing away from the colostomy when desired. The lower elastic strip is equipped with small adjustable rings, or loops, through which leg straps hold the lower elastic strip in position. This belt and the wax coating on the tank hold the colostomy tank in its placed position, the upper strip pulling upward, the lower strip, downward.

Fig. 10 shows a rubber disk with a rigid ring vulcanized within its parts and carrying the upright members of snaps firmly fastened upon the rigid ring. A hole is cut in this disk to receive the Cellophane bag and a surrounding protecting bag of suitable material. Fig. 11 is a reverse view of Fig. 10. This form may be employed for cheapness. It is also quite inconspicuous.

The rubber tank, on the wearer, is snugly form-fitting over a wide area of the abdomen about the colostomy. This prevents the escape of odor more completely than do inflated rings, cups or vessels of narrower contact. Experience seems to indicate that prolapsus of the bowel is not produced by pressure from this widely form-fitting area as is often done by cups or other colostomy devices, which exert pressure on a restricted area about the colostomy. The snugly fitting washer and adjustable stopper fit about the colostomy, and, again, restrict the escape of odor more completely than other colostomy outfits which are not form-fitting with reference to the colostomy. The washer and the adjustable stopper are considered, since they fit closely about the colostomy, as an aid in preventing prolapsus of the bowel. The coating of adhesive wax about the colostomy has the same tendency.

The washer, either plain or flared, is regarded as more desirable for night wear; the adjustable rubber stopper for day wear. A slight degree of play between the washer and the bottom of the tank is desired at night when the wearer rolls about in bed and presses the tank slightly away from the colostomy, although it still adheres to the abdomen. The adjustable stopper fits more snugly into the opening of the tank, prevents more perfectly the escape of odor during day wear, and does not need play between it and the opening in the bottom of the tank during the day.

If and when soiled, the metal front, the wax coated rubber tank and the washer and adjustable stopper are readily cleansed by being placed under the water faucet. The coating of odor-resisting and adhesive wax is easily removed by scraping, or warming and rubbing off, or by boiling in hot water. The wax can be replaced as desired by immersing in melted wax or by smearing melted wax on the part to be coated.

*Brief description of the several views of the drawing*

In the drawing Fig. 1 shows the rubber tank with a Cellophane bag inserted through the colostomy opening of the tank. Fig. 2 shows the reverse face of the same rubber tank, with the Cellophane bag spread about the opening and the adjustable stopper fitted into this opening.

At the right in Fig. 2 is shown the metal front which fits into the tank.

Fig. 3 and Fig. 4 show different views of the flanged rubber washer, wax coated. Fig. 5 shows a roll of flanged rubber, wax coated, which, when rolled about the colostomy, assumes the shape of the colostomy, and may, when so rolled, be pressed into a solid, dipped in melted wax, and become a fairly permanent solid, as in Fig. 6, and conforming to the shape of the colostomy.

Fig. 7 is a rigid rim, which fits inside the rubber tank, Fig. 1, to support its outer circumference in rigid position.

Fig. 8 is the front, made of metal or other rigid material, and may be of varying depths.

Fig. 9 is a view of the improved colostomy outfit as seen on the person of the wearer.

Fig. 10 is a rubber circle or disk with a metal ring vulcanized within and bearing the upright members of suitable snaps. Through a central hole in this rubber circle a suitable bag containing an inner bag of Cellophane is inserted. Fig. 11 is a reverse view of Fig. 10 showing this suitable bag and the inner Cellophane bag spread over the surface of the rubber circle and held in place by the rubber washer or adjustable rubber stopper.

The rubber tank (Fig. 1) has an opening 1 through which the Cellophane bag 2 has been inserted. This opening 1 is placed preferably near one edge of the rubber tank. 3 on Fig. 1 is a rubber flange extending about ¼ of an inch inward from the outer circumference and at the top of the tank to form a tight junction with the metal front when in place.

4 in Fig. 7 is a groove rolled into the metal rim which supports the outer circumference of the rubber tank. On the inner wall of the circumference of the rubber tank is an annular ridge which corresponds to and fits into this groove (4, Fig. 7), thus holding the side walls of the circumference of the rubber tank upright and rigid. The diameter of the metal rim (Fig. 7) is slightly greater than the inside diameter of the rubber tank, thus stretching the bottom of this tank tight and causing it to fit the abdomen more snugly when in position on the wearer.

5 on Fig. 3 is an upright flared rim on the inner circumference of the rubber washer. When this wax coated rubber washer is cut along a radius it may be lapped about the colostomy to fit the colostomy snugly. It can be sewed into position with two or three stitches dipped in melted wax, and be made into a permanent colostomy-fitting washer. 6 (Fig. 2) shows this washer in position when the Cellophane bag has been spread on the under side of the rubber tank.

7 (Fig. 5) shows the lateral flange of a roll of rubber, while 8 (Fig. 5) shows the upright flange on the same roll of rubber, before it has been fitted about the colostomy. When this rubber strip has been cut off so that it is of proper length to fit about the colostomy and, also tightly into the opening (1, Fig. 1) of the rubber tank, the lateral flange (7, Fig. 6) will fit against the abdomen and against the Cellophane bag (as shown by 6, Fig. 2), the outside of the upright flange (8, Fig. 6) will fit tightly into the opening (1, Fig. 1) of the rubber tank, while the inside of this upright flange will fit snugly about the colostomy. This forms a tight fitting adjustable rubber stopper both about the colostomy and into the opening in the tank. When dipped in melted wax it becomes quite permanent.

In Fig. 8, 9 is the upright member of a number of suitable metal snaps. 10, Fig. 9 is the corresponding member of a number of suitable metal snaps attached to an upper adjustable elastic belt (11, Fig. 9) whose length is determined by metal parts similar to those frequently used on men's garters, and a similar lower elastic belt (12, Fig. 9.)

The upper belt (Fig. 9, 11) is equipped with a double loop of ribbon, or other suitable material, one loop of which fits about the elastic belt and the other loop carries a safety pin, the purpose of which is to fasten the clothing back from the colostomy when the colostomy is acting at the toilet. The lower belt carries four small rings (one of which is marked 13, Fig. 9), which are attached to the belt by loops of suitable material and held in position on the lower belt by small safety pins. Through these four rings pass two leg straps (14, Fig. 9) of ribbon or other suitable material, the purpose of these leg straps is to hold the colostomy outfit in its placed position. When properly adjusted in front and behind the pelvis bone the outfit is held nicely in its placed position. The leg straps are adjusted in length by wire loops and rubber collets similar to the fastenings used on men's hose supporters.

15 in Fig. 10 is a flat rubber circle or disk composed of two similar circles, within which a metal ring (16, Fig. 10) has been vulcanized. On this metal ring is permanently fastened the upright member of a snap (17, Fig. 10) similar to the upright member (9, Fig. 8) of the metal snap thereon. A bag (18, Fig. 10) containing an inner bag of Cellophane is thrust through the hole and spread over the reverse surface of the rubber circle (15, Fig. 10). The snap (10, Fig. 9) on the elastic belt (11, Fig. 9) will fit the upright member of the snap (17, Fig. 10). A corresponding upright on the opposite edge of the ring (16, Fig. 10) will snap on a corresponding member of the lower elastic belt (12, Fig. 9).

Figure 11 shows a reverse view of Fig. 10, with the bag containing an inner bag of Cellophane (19, Fig. 11) spread over the rubber circle (15, Fig. 11), with the washer (6, Fig. 11) in place.

I claim:

1. A colostomy outfit consisting of a flat, form-fitting rubber vessel or tank with an opening in the base for the insertion of a disposable container for receiving the bowel discharge, a rim around and over which the edge of the vessel is stretched and held, said edge inwardly turned to form a flange, and a rigid front or top which fits tightly around the rubber flange at the upper circumference of the tank, and the inner sidewalls of the circumference of which tank has an annular ridge and the rim having an annular groove which the annular ridge is adapted to fit.

2. An article of the character described including two main members interfitted and removably connected together, one of which constitutes a cover and the other a receptacle consisting of a rim having a flexible diaphragm stretched over one edge, and extending around the outer circumference thereof and terminating in an inturned flexible flange at its free edge which extends over an edge of the rim to form an air and water-tight joint or packing between the rim and the cover, the diaphragm having an orifice therethrough, a flexible washer fitting and lining said orifice and provided with a flange extending from its projecting edge, and means detachably secured to the cover and adapted to extend around the wearer's body at the upper and lower edges of the device, whereby to be held in snug engagement with the body.

3. An article of the character described including two main members interfitted and removably connected together, one of which constitutes a cover and the other a receptacle consisting of a rim having a flexible diaphragm stretched over one edge, and extending around the outer circumference thereof and terminating in an inturned flexible flange at its free edge which extends over an edge of the rim to form an air and water-tight joint or packing between the rim and the cover, the diaphragm having an orifice therethrough, a flexible washer fitting and lining said orifice and provided with a flange extending from its projecting edge, said washer and flange in convolute form whereby to fit the orifice and the colostomy stoma.

4. An article of the character described including two main members interfitted and removably connected together, one of which constitutes a cover and the other a receptacle consisting of a rim having a flexible diaphragm stretched over one edge, and extending around the outer circumference thereof and terminating in an inturned flexible flange at its free edge which extends over an edge of the rim to form an air and water-tight joint or packing between the rim and the cover, the diaphragm having an orifice therethrough, a flexible washer fitting and lining said orifice and provided with a flange extending from its projecting edge, and a bag, the open end of which is adapted to be inserted through the orifice and held between the diaphragm and the washer and flange.

5. A device of the character described including a front, a rubber tank, the two being detachably connected together, one surface of the tank adapted to conform to and fit the wearer's body and waxed on the said surface which contacts the body, the tank having an orifice therethrough, and a washer adapted to fit the orifice and line the same as well as the adjacent surrounding edge of the orifice, said washer being wax lined to form a close contact with the parts of the anatomy to which it is applied, and with which it contacts and forms an air-tight joint.

CLARENCE DAVID GRAVES.